United States Patent
Green

(10) Patent No.: US 8,630,364 B2
(45) Date of Patent: Jan. 14, 2014

(54) TERMINATION TECHNIQUES FOR MULTI-INDEX CONTINUOUS PHASE ENCODERS FOR WIRELESS NETWORKS

(75) Inventor: Marilynn P. Green, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 842 days.

(21) Appl. No.: 12/180,231

(22) Filed: Jul. 25, 2008

(65) Prior Publication Data
US 2010/0020902 A1 Jan. 28, 2010

(51) Int. Cl.
*H04L 27/00* (2006.01)

(52) U.S. Cl.
USPC ........... 375/295; 375/302; 375/300; 375/219; 375/265; 375/261; 375/260; 375/259

(58) Field of Classification Search
USPC ......... 375/302, 295, 300, 219, 265, 261, 260, 375/259
See application file for complete search history.

(56) References Cited

U.S. PATENT DOCUMENTS

| | | | |
|---|---|---|---|
| 5,712,877 A * | 1/1998 | Ho et al. ..................... | 375/284 |
| 6,023,783 A * | 2/2000 | Divsalar et al. ............... | 714/792 |
| 6,161,209 A * | 12/2000 | Moher .......................... | 714/780 |
| 6,266,795 B1 * | 7/2001 | Wei .............................. | 714/755 |
| 6,292,116 B1 * | 9/2001 | Wang et al. .................... | 341/100 |
| 6,449,304 B1 * | 9/2002 | Holmes et al. ................ | 375/133 |
| 6,530,059 B1 * | 3/2003 | Crozier et al. ................. | 714/786 |
| 6,715,124 B1 | 3/2004 | Betts | |
| 7,657,825 B2 | 2/2010 | Norris et al. | |
| 7,746,761 B2 | 6/2010 | Green | |
| 7,804,376 B2 | 9/2010 | Green et al. | |
| 2002/0196862 A1 * | 12/2002 | Dill et al. ..................... | 375/265 |
| 2003/0099313 A1 | 5/2003 | Li et al. | |
| 2003/0147655 A1 | 8/2003 | Shattil | |
| 2004/0151256 A1 * | 8/2004 | Hwang et al. ................. | 375/267 |
| 2005/0073949 A1 | 4/2005 | Hayashi | |
| 2005/0207474 A1 * | 9/2005 | Voglewede .................... | 375/132 |
| 2005/0254416 A1 | 11/2005 | Laroia et al. | |
| 2007/0030926 A1 * | 2/2007 | Brown et al. ................. | 375/340 |
| 2007/0195740 A1 | 8/2007 | Bhushan et al. | |
| 2008/0165890 A1 * | 7/2008 | Doberstein et al. ........... | 375/298 |
| 2009/0109835 A1 | 4/2009 | Green | |
| 2009/0147669 A1 | 6/2009 | Green | |
| 2009/0154336 A1 | 6/2009 | Green et al. | |

OTHER PUBLICATIONS

Tan, J. "Constant envelop multi-carrier modulation", Proceedings 2002 milcom, 1, (Oct. 2002), 607-611.

Tasadduq, I. A., et al., "OFDM-CPM signals", Electronic letters, 38, (Jan. 2, 2002),80-81.

(Continued)

*Primary Examiner* — Kenneth Lam

(74) *Attorney, Agent, or Firm* — Brake Hughes Bellermann LLP

(57) ABSTRACT

Various example embodiments are disclosed herein. According to an example embodiment, an apparatus may include a multiple modulation index continuous phase encoder (CPE) configured to perform continuous phase encoding on one or more received symbols and to output CPE encoded symbols, the CPE being configured to a known initial state prior to receiving a data block of one or more symbols, and a termination symbol (TS) generator coupled to the CPE, the TS generator configured to generate one or more termination symbols to be appended to the received data block, wherein an ending state of the CPE after receiving the one or more termination symbols is the same as the known initial state of the CPE.

14 Claims, 8 Drawing Sheets

(56) References Cited

OTHER PUBLICATIONS

Fan, P. et al., "Blocked coded modulation for the reduction of the peak to average power ration in OFDM systems.", IEEE trans. consum., electron, 45 (4), (Nov. 1999),1025-1029.

Tellado, J. et al., "Peak power reduction for multicarrier transmission", in proc. Globecom, (1998),219-224.

Wulich, D. et al., "Reduction of peak factor in orthogonal multicarrier modulation by amplitude limiting coding", IEEE Trans. Commun., 47 (1), (Jan. 1999),18-21.

Muller, S. H., et al., "A novel power reduction scheme for OFDM", in proc. IEEE PIMRC, 3, (1997),1090-1094.

Li, X. et al., "M-sequences for OFDM peak-to-average power ratio reduction and error correction", Electron. Lett., 33 (7), (Mar. 1997),554-555.

Nikookar, H. et al., "Random phase updating algorithm for OFDM transmission with low PAPR", IEEE Trans. Broadcast., 48 (2), (Jun. 2002),123-128.

May, T. et al., "Reducing the peak-to-average power ratio in OFDM radio transmission systems, in Proc.", VTC, (1999),2474-2478.

Cimini, L. J., et al., "Peak-to-average power reduction of an OFDM signal using partial transmit sequences, in Proc.", IEEE ICC, (1999),511-515.

Tellado, J. et al., "Efficient algorithms for reducing PAR in multicarrier systems, in proc.", IEEE inf. Theory Symp., (1998),191.

Jiang, T. et al., "Nonlineaar companding transform for reducing peak-to-average power ratio of OFDM signals", IEEE Trans. Broadcast, 50 (3), (Sep. 2004),342-346.

Ren, G. et al., "A complementary clipping transform technique for the reduction of peak-to-average power ratio of OFDM system", IEEE Trans. Consum. Electron., 49 (4), (Nov. 2003),922-926.

Slimane, S. B., "reducing the peak-to-average power ratio of OFDM signals through precoding", IEEE Trans. on vehicular technology, 56 (2), (Mar. 2007),686-695.

Kristensen, Frederik et al., "Flexible baseband transmitter for OFDM", 1. 1. Dep. of Electroscience and CCCD. Box 118, Lund University. SE-221 00 Lund, Sweden, (Nov. 7, 2003),1-6.

Saltzberg, B. R., "Performance of an Efficient Parallel Data Transmission System", IEEE Transactions on Communication Technology,15(6), (Dec. 1967),805-811.

Tasadduq, I. A., et al., "PAPR Reduction of OFDM Signals Using Multiamplitude CPM", Electronics Letters 38(16), (Jan. 17, 2002),915-917.

Falconer, D. et al., "Frequency Domain Equalization for Single-Carrier Broadband Wireless Systems", IEEE Communications Magazine, (Apr. 2002),1-9.

Chatterjee, S. et al., "Adaptive Modulation based MC-CDMA Systems for 4G Wireless Consumer Applications", IEEE Transactions on Consumer Electronics, 49(4), (Nov. 2003),995-1003.

Peled, A. et al., "Frequency Domain Data Transmission using Reduced Computational Complexity Algorithms", Computer Sciences Department, (1980),964-967.

Guinand, P. et al., "Trellis Termination for Turbo Encoders", Communications Research Centre; Ottawa, Canada, (May 1994),389-392.

Moqvist, P. et al., "Seriall Concatenated Systems: An Iterative Decoding Approach with Application to Continuous Phase Modulation", Department of Computer Engineering, Chalmaers University of Technology; Sweden, (1999),1-69.

Divsalar, D. et al., "Turbo Codes for PCS Applications", Jet Propulsion Laboratory, California Institute of Technology; California, (1996),1-6.

Moqvist, P. et al., "Trellis Termination in CPM", Electronics Letters, vol. 36, No. 23, Nov. 9, 2000 1940-1941.

Moqvist, P. et al., "Serially Concentrated Continuous Phase Modulation With Iterative Decoding", IEEE Transactions on Communcations, vol. 49, No. 11, (Nov. 2001),1-15.

Huang, Fu-Hua "Thesis: Evaluation of Soft Output Decoding for Turbo Codes", http://scholar.lib.vt.edu/theses/available/etd-71897-15815/; Virginia Tech, (May 29, 1997).

Hokfelt, Johan et al., "Distance Spectra of Turbo Codes Using Different Trellis Termination Methods", Dept. of Applied Electronics, Lund University Sweden, (2000),1-4.

Notice of Allowance for U.S. Appl. No. 11/956,113, mailed on Jul. 21, 2010, 10 pages.

Non-Final Office Action for U.S. Appl. No. 11/953,488, mailed on Aug. 5, 2010, 24 pages.

Cimini, Leonard J., et al., "Peak-to-Average Power Ratio Reduction of an OFDM Signal Using Partial Transmit Sequences", IEEE Communications Letters, vol. 4, No. 3, Mar. 2000, pp. 86-88.

Hokfelt, Johan et al., "Distance Spectra of Turbo Codes Using Different Trellis Termination Methods", Annales des Telecommunications, vol. 56, No. 7-8, 2001, 4 pages.

\* cited by examiner

TERMINATION TECHNIQUES FOR MULTI-INDEX CONTINUOUS PHASE ENCODERS FOR WIRELESS NETWORKS

TECHNICAL FIELD

This description relates to encoding.

BACKGROUND

Continuous phase modulation (CPM) is a nonlinear modulation scheme in which the information symbols are used to modulate the phase of a complex exponential, for example. It has been shown that a conventional CPM may be decomposed into a linear continuous phase encoder followed by a memory-less modulator. It may be desirable to adapt CPM systems for more complex systems.

SUMMARY

According to an example embodiment, a method may include placing a multi-modulation index continuous phase encoder (CPE) in a known initial state prior to receiving a data block, receiving, at the CPE, a data block that includes one or more symbols, determining one or more termination symbols to be appended to the received data block, receiving, at the CPE, the one or more termination symbols, wherein an ending state of the CPE after receiving the one or more termination symbols is the same as the known initial state of the CPE.

According to another example embodiment, a method may include placing a multi-modulation index continuous phase encoder (CPE) in an initial zero state prior to receiving a data block, the state of the CPE being based on one or more received symbols and a partial cumulative phase for each of a plurality of modulation indexes, receiving a data block including one or more symbols, and determining one or more termination symbols to be appended to the received data block that forces each of the partial cumulative phases to zero after receiving the data block and the one or more termination symbols, and receiving the determined termination symbols to cause the CPE to end at the zero state.

According to another example embodiment, a method may include receiving, at a multiple modulation index continuous phase encoder (CPE), a data block that includes one or more symbols, determining one or more termination symbols to be appended to the received data block that forces a partial cumulative phase associated with each of a plurality of modulation indexes for the CPE to a zero state, and inputting the determined termination symbols to the CPE.

According to an example embodiment, an apparatus may include a multiple modulation index continuous phase encoder (CPE) configured to receive a data block that includes one or more symbols, and a termination symbol generator that is configured to: determine one or more termination symbols to be appended to the received data block that forces a partial cumulative phase associated with each of a plurality of modulation indexes for the CPE to a zero state, and input the determined termination symbols to the CPE.

According to yet another example embodiment, an apparatus may include a multiple modulation index continuous phase encoder (CPE) configured to perform continuous phase encoding on one or more received symbols and to output CPE encoded symbols, the CPE being configured to a known initial state prior to receiving a data block of one or more symbols, and a termination symbol (TS) generator coupled to the CPE, the TS generator configured to generate one or more termination symbols to be appended to the received data block, wherein an ending state of the CPE after receiving the one or more termination symbols is the same as the known initial state of the CPE.

The details of one or more implementations are set forth in the accompanying drawings and the description below. Other features will be apparent from the description and drawings, and from the claims.

DETAILED DESCRIPTION

Figure 1:
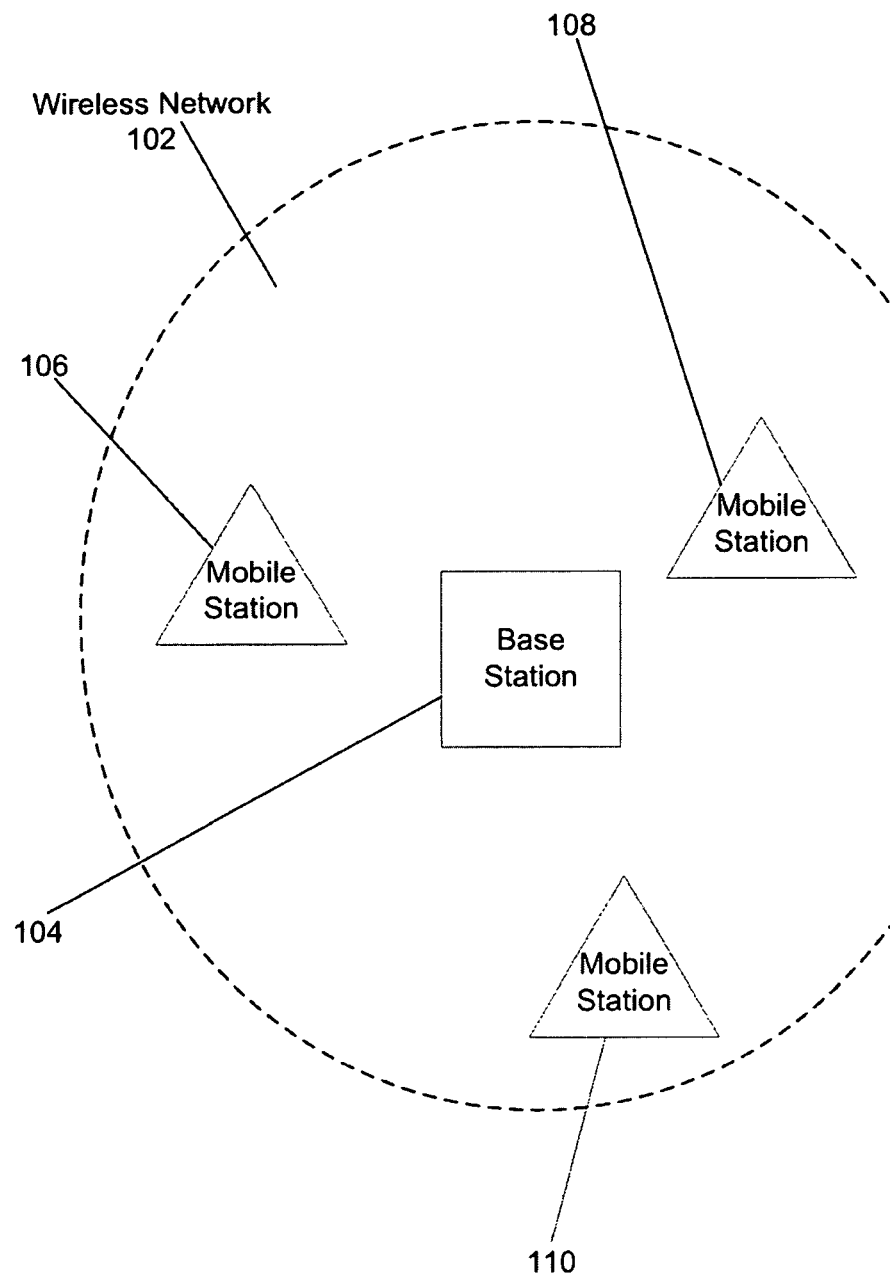
FIG. 1 is a block diagram of a wireless network according to an example embodiment.

FIG. 1 is a block diagram of a wireless network 102 including a base station 104 and three mobile stations 106, 108, 110 according to an example embodiment. Although not shown, mobile stations 106, 108 and 110 may be coupled to base station 104 via relay stations or relay nodes, for example. The wireless network 102 may include any wireless network, such as, for example, an IEEE 802.16 Worldwide Interoperability for Microwave Access (WiMAX) network, an IEEE 802.11 Wireless Local Area Network (WLAN), or a cellular telephone network, a network based on 3GPP (Third Generation Partnership Project), based on LTE (Long Term Evolution), or other wireless network.

The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" may include any type of wireless node, such as base stations, mobile stations, etc. While the present disclosure may use some of the terminology of WiMax or other wireless standards, aspects of the present disclosure may be applicable to any networking or wireless technologies.

According to an example embodiment, a continuous phase modulation (CPM) transmitter may include a continuous phase encoder (CPE) to perform continuous phase encoding on received symbols, and a phase modulator to phase modulate an output signal based on one or more CPE encoded symbols received from the CPE. According to an example embodiment, a trellis termination symbol generator may be provided to determine (or calculate) and generate one or more termination symbols. The termination symbols may be appended to the end of a block of data symbols that are input to a continuous phase encoder (CPE). The CPE may be provided in a known initial state, such as the zero state, prior to receiving the data block, although any known initial state may be used. The termination symbols input to the CPE may operate to force or drive the ending state of the CPE (e.g., prior to receipt of the next block, such as after the data block and termination symbols have been input to the CPE) to the same state as the initial state of the CPE. Thus, in this manner, by generating or input termination symbols that may drive or force the ending state of the CPE to be the same as the initial state of the CPE for a data block, phase discontinuities between data blocks may at least be decreased and/or avoided, which may improve spectral efficiency of the CPM transmitter.

Continuous phase modulation (CPM) is a modulation scheme in which the information symbols are used to modulate the phase of a complex exponential. The CPM waveform may, for example, operate or change, as a finite state machine, where the phase output by the CPM for the current (or kth) symbol may be a function of the current (or kth) symbol and L−1 previous symbols, for example.

A continuous phase modulation (CPM) transmitter may include, for example, a continuous phase encoder (CPE) that performs continuous phase encoding on received symbols, followed by a phase modulator (such as a memoryless modulator) that may phase modulate a signal based on the received CPE encoded symbols output by the CPE. The continuous phase encoder (CPE) may typically define the phase trellis upon which the signal is designed. CPM may be modelled or provided as a CPE followed by a memoryless modulator, wherein the memoryless characteristic of the modulator typically means that it operates only on the current input (i.e., without regard to the past input or past inputs). This is merely an example, and other types of modulators may be used. This decomposition (which is known as Rimoldi's tilted phase decomposition) exposes a simpler state space model for CPM (and CPM-derived schemes) and results in a phase trellis that has fewer states. Thus, the tilted phase decomposition leads to reduced complexity receiver design and is otherwise convenient for decoupling the finite state machine nature of CPM from the modulation with which it is concatenated.

In general, a CPE may operate as a finite state machine on a linear mapping of the sequence of information symbols and transitions according to a pre-defined time-dependent state evolution model. Depending on the number of memory elements, L, in the CPE, the resulting scheme can either be classified as full-response (L=1) or partial response (L>1). In the former case, a single symbol causes a time-varying system response for a single symbol interval and is thereafter absorbed as a constant contributor into a cumulative phase term. For partial response schemes, a single symbol actively contributes over L consecutive symbol intervals before entering the phase accumulation unit where a cumulative phase is calculated.

Thus, according to an example embodiment, a CPM system can be decomposed into a linear continuous phase encoder followed by a memory-less modulator or phase modulator. Data symbols may be modified to allow only positive symbol values, for example. The modified symbols may be input to the CPE (continuous phase encoder), where the modified symbols may have a value between 0 and M−1, e.g., $U_k \in \{0, \ldots, M-1\}$. Thus, for a binary system in which M=2, the input symbols $U_k$ may have a value of either 0 or 1, as a simple example. These symbols are input to the CPE to produce CPE encoded symbols that are input into the phase modulator or memoryless modulator. The CPE can be applied to any CPM-based scheme which operates over the same phase trellis as CPM, according to an example embodiment. Hence, it is widely applicable to a number of communications scenarios.

The output of the CPE is the (L+1)×1 vector, $y_k$, which has elements $y_k = (\theta_{k-L}, U_{k-(L-1)}, \ldots, U_k)^T$. The state of the CPE is defined by $x_k = (\theta_{k-L}, U_{k-(L-1)}, \ldots, U_{k-1})^T$. $U_k$ is the current or most recently received input symbol. Thus, the state of the CPE may be defined based on the L−1 most recently received symbols before the current symbol interval ($U_{k-1}, \ldots U_{k-(L-1)}$) (which are inputs to the CPE), and a cumulative phase (or cumulative phase term) $\theta_{k-L}$ which may include contributions from input symbols older than the L most recent symbols. Because it includes contributions from multiple older symbols, the cumulative phase $\theta_{k-L}$ may operate as a smoothing function between symbols, and thus, may reduce or decrease (or in some cases may eliminate) phase discontinuities between symbols within a data block. By decreasing discontinuities between symbols, the cumulative phase $\theta_{k-L}$ may improve spectral efficiency of the CPM transmitter, according to an example embodiment of a CPM transmitter. However, in some cases, discontinuities may still exist between data blocks.

Thus, according to an example embodiment, a trellis termination symbol generator may be provided to determine (or calculate) and generate one or more termination symbols to be appended to the end of the modified data symbols of a block that is input to the CPE. The CPE may be provided in a known initial state, such as the zero state, prior to receiving the data block, although any known state may be used. The termination symbols may operate to force or drive the ending state of the CPE (e.g., after the data block and termination symbols have been input to the CPE) to the same state as the initial state of the CPE. Thus, in this manner, by generating or input termination symbols that may drive or force the ending state of the CPE to be the same as the initial state of the CPE for a data block, the phase discontinuities between blocks may be avoided or at least decreased, which may improve spectral efficiency of a CPM transmitter. The operation of the CPE and the example trellis termination generator are described in greater detail below.

For partial response schemes (L>1), the following terminology may be used, by way of example:

L: Number of memory elements in the CPE
$\theta_{k-L}$: Cumulative phase term (contains the contributions of all symbols that are older than L past symbols)
$U_k$: Current symbol transmitted during the kth symbol interval
$h_k$: Rational modulation index associated with transmission of $U_k$
$A_k$: (L×L) state matrix
B: (L×1) control matrix
$C_k$: (L+1)×L observation matrix
D: (L+1)×1 transition matrix
$y_k$: (L+1)×1 output vector
$x_k$: (L×1) state vector
$u_k$: (1×1) current information symbol ($u_k = U_k$)

The following illustrates an example. However, other examples or embodiments may be used. When the modulation index $h_k$ may be expressed as a rational number (such as $h_k = K_k/P$), where $K_k$ and P are relatively prime integers, then the CPM-based scheme operates over a finite trellis and it has a well-defined state space representation. Typically, for multi-index schemes, the modulation indices may be selected in a modulo fashion from a finite set, such that $h_k = h_{(k)}$, where $h_{(k)} = h_{k \bmod N_h}$, and $N_h$ denotes the number of modulation indices in the set $\{h_0, \ldots, h_{N_h-1}\}$.

The cumulative phase term may for example operate over the ring of integers modulo P, i.e., $\theta_{k-L} \in \{0,\ldots,P-1\}[1]$. The output of the CPE is the (L+1)×1 vector, $y_k$, which has elements $$y_k = (\theta_{k-L}, U_{k-(L-1)}, \ldots, U_k)^T.$$

The state vector $x_k$ (state of the CPE) for the current or $k^{th}$ symbol interval may, for example, have L components, and may be defined as follows:

$$x_k = (\theta_{k-L}, U_{k-(L-1)}, \ldots, U_{k-1})^T.$$

For the general, multi-index case (wherein $N_h > 1$), the matrices which comprise the state-space of the CPE may be defined as follows:

$$A_k = \begin{pmatrix} 1 & K_{k-(L-1)} & 0 & \ldots & \ldots & \ldots & 0 \\ 0 & 0 & 1 & 0 & \ldots & \ldots & 0 \\ 0 & 0 & 0 & 1 & 0 & \ldots & 0 \\ \vdots & \vdots & & 0 & 1 & & \vdots \\ \vdots & \vdots & & \vdots & & \ddots & 0 \\ 0 & 0 & 0 & 0 & \ldots & 0 & 1 \\ 0 & 0 & 0 & 0 & 0 & \ldots & 0 \end{pmatrix}; B = \begin{pmatrix} 0 \\ 0 \\ 0 \\ 0 \\ \vdots \\ 0 \\ 1 \end{pmatrix};$$

$$C = \begin{pmatrix} 1 & 0 & \ldots & \ldots & \ldots & \ldots & 0 \\ 0 & 1 & 0 & \ldots & \ldots & \ldots & 0 \\ \vdots & 0 & 1 & \ddots & 0 & \ldots & 0 \\ \vdots & \vdots & \ddots & 1 & \ddots & \ddots & \vdots \\ \vdots & \vdots & 0 & \ddots & 1 & \ddots & 0 \\ \vdots & \vdots & \vdots & 0 & \ddots & \ddots & 0 \\ \vdots & \vdots & \vdots & \vdots & 0 & \ddots & 1 \\ 0 & 0 & 0 & 0 & 0 & 0 & 0 \end{pmatrix}; D = \begin{pmatrix} 0 \\ \vdots \\ \vdots \\ \vdots \\ \vdots \\ \vdots \\ 0 \\ 1 \end{pmatrix}$$

The CPE has the following state space representation:

$$x_{k+1} = A_k x_k + B u_k$$

$$y_k = C x_k + D u_k$$

Thus, in an example embodiment, the state $(x_{k+1})$ of the CPE for the next (or k+1) symbol interval may be a function of the current state $x_k$ and the current symbol $u_k$ that has been input to the CPE, e.g., defined based on the matrices A and B, shown above. Similarly, the output $(y_{k+1})$ of the CPE for the next (or k+1) symbol interval may be a function of the current state $x_k$ and the current symbol $u_k$ that has been input to the CPE, e.g., based on matrices C and D, shown above, according to an example embodiment.

Also, the first element of $x_k[1] = y_k[1] = \theta_{k-L}$ may typically be computed modulo P.

For L=1 (full-response), the state space representation undergoes the following modification—

$$A = [1]; B_k = [K_n]; C = \begin{pmatrix} 1 \\ 0 \end{pmatrix}; D = \begin{pmatrix} 0 \\ 1 \end{pmatrix};$$

and the corresponding state equations are given by $$x_{k+1} = A x_k + B_k u_k$$

$$y_k = C x_k + D u_k.$$

As in the partial response case, we note that the first element of $x_k[1] = y_k[1] = \theta_{k-L}$ is computed modulo P, where P is the denominator of the modulation index, for example.

The output of the CPE may be used in a variety of CPM-based schemes. For example, in conventional CPM, the output, $y_k$, of the continuous phase encoder is fed into the input of a memory-less modulator or a in order to construct the continuous-time multi-index CPM signal. Over the kth symbol interval, the complex low-pass equivalent CPM signal may be represented as follows:

$$s(t; U) = e^{j2\pi(\theta_{k-L}/P)} e^{j4\pi(1/P)} \sum_{i=0}^{L-1} U_{k-i} K_{k-i} q(t-(k-i)T)$$

$$e^{-j2\pi(1/P)(M-1)} \sum_{i=0}^{L-1} K_{k-i} q(t-(k-i)T) e^{-j\pi(1/P)(M-1)} \sum_{i=-(L-1)}^{k-L} K_i$$

$$kT \leq t < (k+1)T$$

which is a constant envelope, continuous phase modulation having multiple modulation indices (i.e., multi-h CPM). T denotes the symbol interval and q(t) is a phase response function, which is defined in order to control the spectral containment of the CPM waveform. In general, smoothly varying longer pulses may typically result in higher spectral efficiency and less leakage into adjacent channels.

In addition, according to an example embodiment, one or more termination (or tail) symbols $t_0, \ldots, t_{T-1}$ may be generated that return the state of the CPE $(x_k = (\theta_{k-L}, U_{k-(L-1)}, \ldots, U_{k-1})^T.)$ to a known final state (e.g., where the final state of the CPE may be the state of the CPE just prior to the CPE receiving the next data block, and/or the state of the CPE after receiving a data block and the termination symbols for the data block). An extended block may include a data block plus the appended termination symbols. Thus, the termination symbols may be generated to return the state of the CPE at the end of the extended block to the same as the state of the CPE at the beginning of the extended block, for example (e.g., return the CPE to the known zero state or other known state for the end of the extended block, which may be just before receipt of a new data block). The various embodiments and techniques described herein may be useful, for example, in a wide variety of applications and schemes, such as, by way of example, in APP-based decoding schemes (such as max-log-APP and related turbo coding) wherein the initial and final state of the encoder is assumed to be known for calculation of the appropriate path metrics. The various embodiments and techniques described herein may also be used in a variety of other applications or systems. The various techniques and embodiments described herein may also be useful, for example, for blockwise a posteriori probability decoding techniques wherein the final state is assumed to be known. For many popular iterative decoding techniques (such as max-log-APP decoding and related turbo decoding), it is advantageous when the decoder both starts and ends in a known state, since the initial and final conditions may typically be used to initialize the calculation of the path metrics. In addition, for CPM-OFDMA, returning the phase state back to its initial value can be used to remove, or at least decrease, phase discontinuity from the transmission and thereby reduce the transmission bandwidth, for a higher spectral efficiency.

Figure 2:
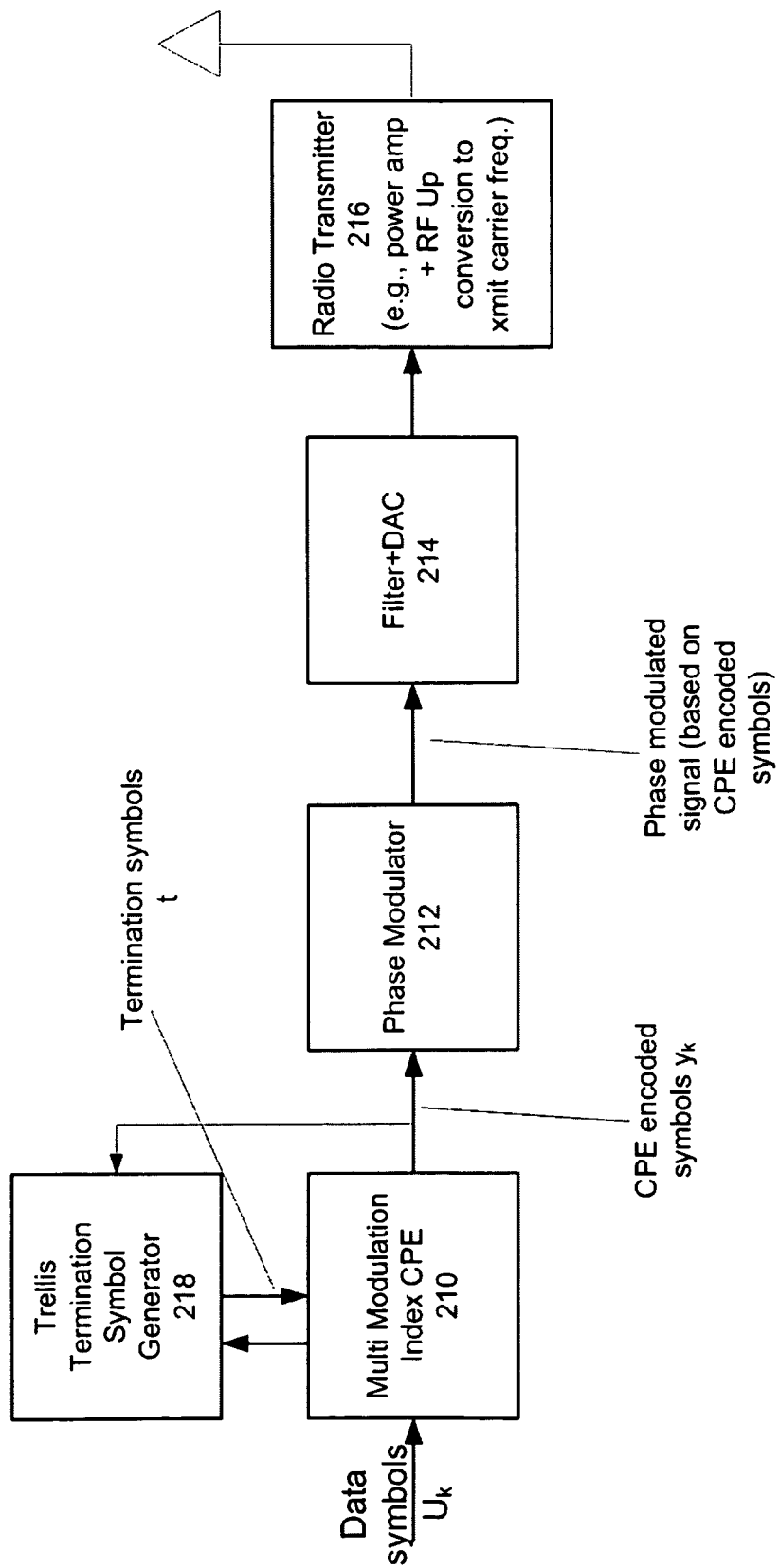
FIG. 2 is a block diagram of a continuous phase modulation (CPM) transmitter according to an example embodiment.

FIG. 2 is a block diagram of a continuous phase modulation (CPM) transmitter according to an example embodiment. The CPM modulator 200 may include, for example, a multiple modulation index continuous phase encoded (CPE) 210 for continuous phase encoding the received symbols $U_k$. A phase modulator 214 may generate a phase modulated output signal based on the CPE encoded symbols output from the multi modulation index CPE 210. For example, the CPE encoded symbols output from CPE 210 may be phase modulated onto one subcarrier, or onto a plurality of subcarriers (e.g., onto one or more Orthogonal Frequency Division Multiplexed, or OFDM, subcarriers), as examples. In one example embodiment, the phase modulator 214 may be a memoryless modulator, wherein the memoryless characteristic of the modulator may typically means that it operates only on the current input (i.e., without regard to the past input or past inputs). The use of a memoryless modulator is merely an example embodiment, and other types may be used. The phase modulated output signal may then be filtered and converted from a digital to an analog by a filter and DAC block 214, according to an example embodiment. A radio transmitter 216 may then up convert the signal to a transmission carrier and amplify and transmit the signal from an antenna via a wireless channel. The CPM transmitter 200 may include other blocks, not shown, and some of the blocks may be omitted, according to other example embodiments.

According to an example embodiment, a trellis termination symbol generator 218 may be coupled to the multi index CPE 210 and the phase modulator 210. Termination symbol generator 218 may be provided to determine (or calculate) and generate one or more termination symbols. The termination symbols may be appended to the end of a block of data symbols $U_k$ that are input to a continuous phase encoder (CPE) 210. The CPE 210 may be provided in a known initial state, such as the zero state, prior to receiving the data block, although any known initial state may be used. The termination symbols input to the CPE may operate to force or return the block ending state of the CPE (e.g., prior to receipt of the next block, such as after the data block and termination symbols have been input to the CPE 210) to the same state as the initial state of the CPE 210. Thus, in this manner, by generating and inputting termination symbols to CPE 210 that may return the ending state of the CPE 210 to the same state as the initial state of the CPE for a data block, phase discontinuities between data blocks may at least be decreased and/or avoided, which may improve spectral efficiency of the CPM transmitter 200, at least in some cases.

Figure 3:
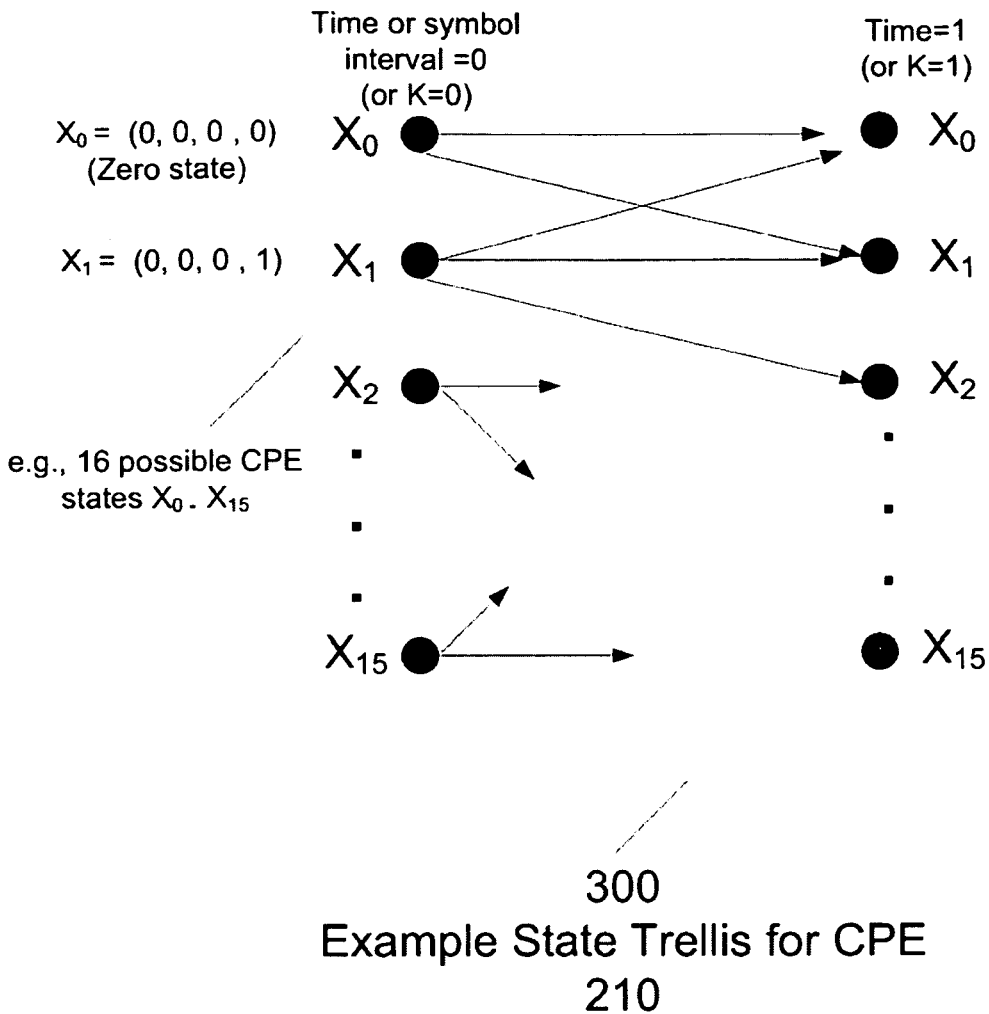
FIG. 3 is a figure illustrating an example state trellis for CPE 210 according to an example embodiment.

FIG. 3 is a figure illustrating an example state trellis for CPE 210 according to an example embodiment. The state trellis shown in FIG. 3 illustrates multiple possible states $X_0$, $X_1$, ... $X_{15}$ for each of a plurality of different symbol intervals, e.g., for k=0, k=1, ... where k indicates the time or symbol interval. There is a bullet or node shown for each possible state, according to an example. In this example, the state vector $x_k$ (state of the CPE) for the current or $k^{th}$ symbol interval may, for example, have L components, and may be defined as follows: $x_k=(\theta_{k-L},U_{k-(L-1)}, \ldots ,U_{k-1})^T$. For example, the CPE state may include 4 elements (defining 16 different possible states for the CPE), including 3 of the most recent received symbols before the current symbol interval ($U_{k-1}, \ldots U_{(k-L)-1)}$) (which are symbol inputs to the CPE), and a cumulative phase $\theta_{k-L}$. Each state may have one or more possible next states, depending on the current state of the CPE, as shown by the lines connecting the current symbol interval (k=0) to the next symbol interval (k=1). Thus, for example, the zero state may be provided when all 4 of the elements of the CPE state are zero, e.g., 3 of the most recent received symbols ($U_{k-1}, \ldots U_{(k-L)-1)}$) each are equal to zero (0), and the cumulative phase $\theta_{k-L}$ is equal to zero (0) as well.

CPE 210 is a multiple modulation index CPE. In one example embodiment, a different trellis state may be provided for each modulation index. Alternatively, one trellis, which has time varying properties, may be provided for a multiple modulation index CPE (e.g., where the time varying properties reflect the varying states for the different modulation indexes.

According to an example embodiment, a technique is provided for terminating the trellis of a CPE 210 into a known state by the use of termination symbols, which are generated and appended to a block of data that is input to the CPE. The CPE of a multi-index scheme has a time-varying state space description since the elements of the state matrix (for L>1) or the control matrix (for L=1) are time-dependent. A model for the CPE which takes into account the time-varying nature of the applied modulation index is described. In addition, for example, it may be assumed that a block of N (possibly coded) data symbols $\{U_0,\ldots,U_{N-1}\}$ arrive serially at the CPE 210. After processing the last data symbol, $U_{N-1}$, the termination symbol generator 218 inputs or sends a series of trellis termination symbols, $\{t_0,t_1,\ldots,t_{T-1}\}$ (where $t_i \in \{0,\ldots,M-1\}$) to the CPE 210. The trellis termination symbols may be numerically calculated, for example, such that the CPE 210 transitions to a known final state $x_{N-T}$. The length of the termination sequence may be defined based on the value of the cumulative phase when the first termination symbol enters the modulo P adder, the cardinality of the CPM-based scheme (M) and the value of P. The length of the termination sequence may also be defined, according to an example embodiment, such that it is independent of the data sequence. This is described in more detail herein.

In an example embodiment, the data symbols U are received from symbol intervals k=0, . . . , N−1. Then, T trellis termination symbols are generated and sent from termination symbol generator 218 and input to the CPE 210. Thus, in an example embodiment, after the last termination symbol has been sent (or input to CPE 210), there has been sent (or input to CPE 210) a total of N+T symbols (N data symbols, followed by T termination symbols). The last termination symbol appears at time (or symbol interval) N+T−1 (since the block of data starts with a zero index, for example). After sending the last termination symbol, the next state of the CPE will be the zero state (or other desired state) at time N+T.

According to an example embodiment, the all-zero state (which may be referred to as the zero state of the CPE 210) may be selected as the known initial state for CPE 210, although any state of the CPE may be selected as the known initial state. The zero state is merely an example. The all-zero state may be illustrated as $x_{N+T}=(0\ 0\ \ldots\ 0)$, and may be provided as both the initial CPE state and as the (desired) final CPE state. $x_{N+T}$ may refer to the state (X) of the CPE 210 after the CPE has received the last termination symbol, where there may be T termination symbols provided or appended to a block of data, including $t_0, t_1, \ldots t_{T-1}$, to return the CPE state to the initial state. Thus, if the zero (or all-zero) state is selected as the initial state, then the termination symbols, which are appended to the data block, may be selected and generated by termination symbol generator 218 to return (or force) the state of CPE 210 back to the zero state at the end of the extended block (e.g., after the data block and associated termination symbols have been input into the CPE 210). Thus, the CPE state may be zero (e.g., just prior to receiving the data block) and the ending state for the CPE (e.g., after receiving the data block and associated termination symbols) may also be the zero state. Thus, for example, by using a same (or common) CPE state for both the beginning or initial state and an ending state of an extended block (including data and termination symbols) for a CPE 210, this may avoid or at least decrease the discontinuities in phase (e.g., output by the phase modulator 212) between data blocks. For example, if the ending state of the CPE for a first data block is the same as the initial state for a second data block (e.g., both states being the zero state), then the phase of the signal output by the CPM transmitter may be continuous (or substantially continuous or without discontinuities) at the junction between the first and second data blocks. This is merely an example. In another example embodiment, the trellis for the CPE 210 may be terminated (or ended for a block) into any desired state.

According to an example embodiment, a block-wise transmission may be provided, where N (possibly coded) data symbols, $U_0, \ldots, U_{N-1}$, may be input to the CPE 210 and the last data symbol may be followed by a sequence of one or more termination symbols. the transition that occurs when to (or the first termination symbol) reaches the modulo-P adder, e.g., when the first termination symbol begin contributing to the cumulative phase $\theta_{k-L}$. In order to begin (and assuming L>1) the generic k th symbol interval is considered. The state vector evolves in the following manner:

$$x_{k+1} = A_k x_k + B u_k$$

$$\begin{pmatrix} \theta_{k+1-L} \\ U_{k+1-(L-1)} \\ \vdots \\ \vdots \\ \vdots \\ \vdots \\ U-k \end{pmatrix} = \begin{pmatrix} 1 & K_{k-(L-1)} & 0 & \cdots & \cdots & \cdots & 0 \\ 0 & 0 & 1 & 0 & \cdots & \cdots & 0 \\ 0 & 0 & 0 & 1 & 0 & \cdots & 0 \\ \vdots & \vdots & \vdots & 0 & 1 & & \vdots \\ \vdots & \vdots & \vdots & \vdots & \ddots & \ddots & 0 \\ 0 & 0 & 0 & 0 & \cdots & 0 & 1 \\ 0 & 0 & 0 & 0 & 0 & \cdots & 0 \end{pmatrix} \begin{pmatrix} \theta_{k-1} \\ U_{k-(L-1)} \\ \vdots \\ \vdots \\ \vdots \\ \vdots \\ U_{k-1} \end{pmatrix} + \begin{pmatrix} 0 \\ 0 \\ \vdots \\ \vdots \\ \vdots \\ 0 \\ 1 \end{pmatrix}(u_k)$$

By definition, the cumulative phase may be the modulo P summation of the modified data symbols, each weighted by its respective modulation index factor, $K_{(i)}$:

$$\text{e.g., } \theta_{k-L} = \left( \sum_{i=0}^{k-L} K_{(i)} U_i \right) \bmod P.$$

By the principles of linear superposition (over the ring of integers modulo P), this summation may be equivalently expressed in terms of the partial contributions of terms that are weighted by the same modulation index factor—

$$\theta_{k-L} = (K_0(U_0 + U_{N_h} + \ldots + U_{\lceil (k-L)/N_h \rceil}) ++$$
$$K_1(U_1 + U_{N_h+1} + \ldots + U_{1+N_h \cdot \lceil (k-L-1)/N_h \rceil}) + \ldots +$$
$$K_{N_h-1}(U_{N_h-1} + U_{2N_h-1} + \ldots + U_{N_h-1+N_h \cdot \lceil (k-L-N_h)/N_h \rceil})) \bmod P$$

Referring to the equation above, the bracket in the last U term for each K group is a ceiling operation which rounds up to the nearest integer.

For example, for k=13, L=3, $N_h$=3, ($N_h$=3 means there are three modulation indexes in this example), the cumulative phase can be expressed as follows:

$$\theta_{k-L} = \theta_{10} = (K_0(U_0 + U_3 + U_6 + U_9) + K_1(U_1 + U_4 + U_7) + K_2(U_2 + U_5 + U_8)) \bmod P$$

This may provide a partial cumulative phase associated with each modulation index (or associated with each modulation index factor K). Thus, there will be $N_h$ partial cumulative phases (or $N_h$ partial cumulative phase terms) as follows, for example (where n identifies the modulation index):

$$\theta_{k-L}^n = (U_n + U_{n+N_h} + \ldots + U_{n-N_h \cdot (\lceil ((k-L)-n)/N_h \rceil -1)}) \bmod P$$

$$n = 0, \ldots, N_h - 1$$

Thus, it can be seen from the above equation, that each partial cumulative phase (for each modulation index n) may be calculated or determined based on a group of received symbols, for example.

In order to return the cumulative phase term to the zero state, each of the partial cumulative phases should be returned to the zero state, according to an example embodiment. If each of the partial cumulative phases are zero, then the different K's (for the different partial cumulative phases) can be pulled out or ignored, since any number multiplied by zero is zero, for example. Since the cumulative phase is the linear superposition (over the ring of integers modulus P) of the partial cumulative phase terms, the cumulative phase can be returned to the zero state by returning each of its partial components (partial cumulative phases) back to the zero state. Thus, according to an example embodiment, a number of steps may be taken to accomplish this, such as: (1) first return each of the cumulative phases to the zero state (e.g., select and generate termination symbols to cause each partial cumulative phase to be equal to zero, $\theta_n=0$ at some future time, n≥k−L) and (2) to reset the remainder of the CPE state (the U input symbols) to be equal to the all zeros-vector, so that $x_n = (0,0,\ldots,0)^T$ at future time n≥k−L.

Figure 4:
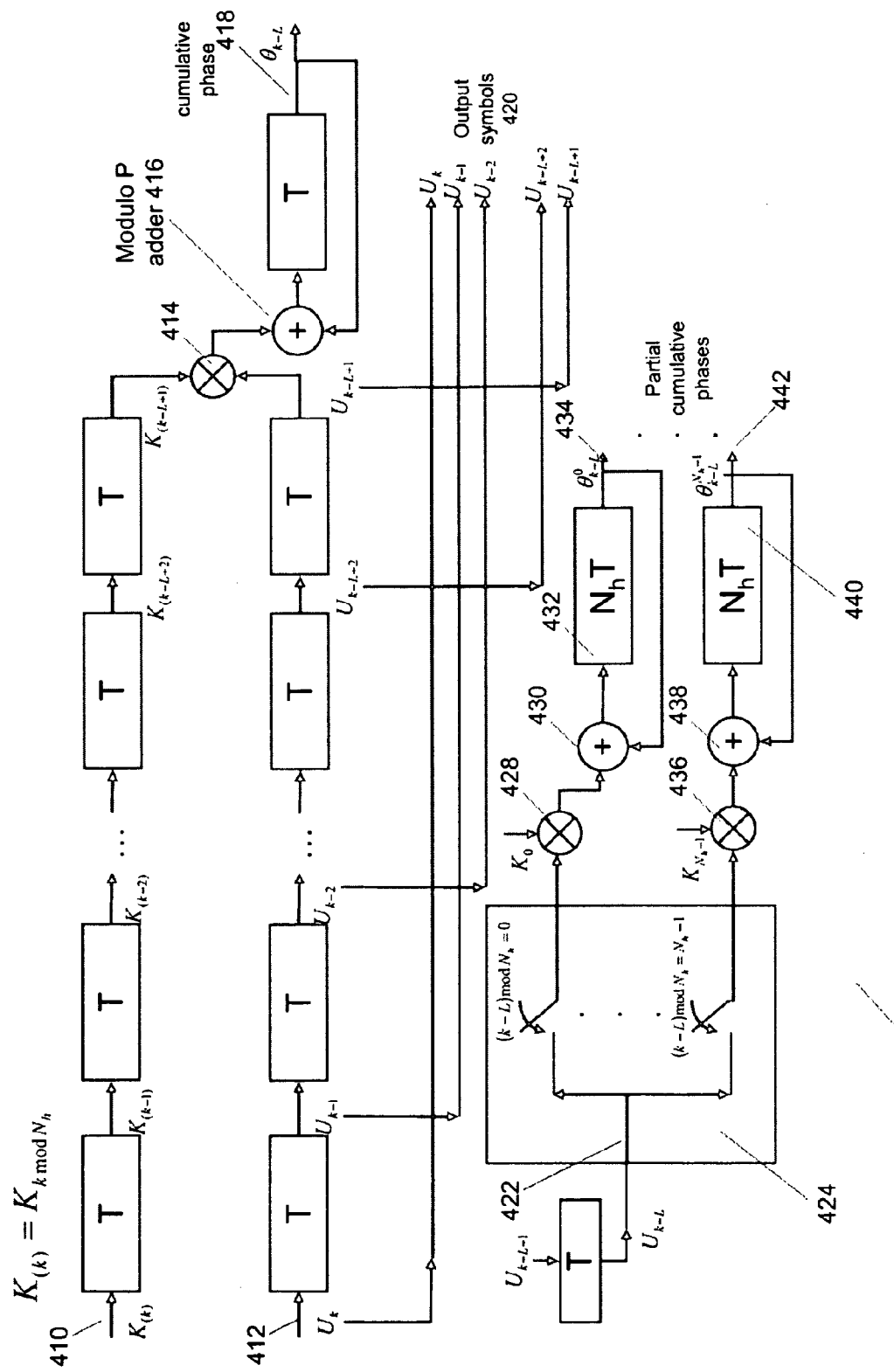
FIG. 4 is a block diagram illustrating an example of the multiple modulation index continuous phase encoder (CPE) 210 shown in FIG. 2 according to an example embodiment.

FIG. 4 is a block diagram illustrating an example of the multiple modulation index continuous phase encoder (CPE) 210 shown in FIG. 2 according to an example embodiment. CPE 210 may sequentially receive modulation index factors K via line 410, and may sequentially receive input symbols U via line 412. As noted, there may be $N_h$ modulation indexes for CPE 210. For example, there may be 3 modulation indexes. Each modulation index may be provided or determined as K/P, where K is the modulation index factor that may be different for each modulation index, and P may be the same for all of the modulation indexes. For a multiple modulation index CPE 210, the modulation indexes (and the associated modulation index factors K) input to the CPE via line 410 may change every symbol interval modulo $N_h$, e.g., the $N_h$ modulation index factors may be input sequentially via line 410 and then they repeat. For example, in the case of 3 modulation indexes (and thus, three modulation index factors $K_0, K_1, K_2$), the modulation indexes or the modulation index factors K input to the CPE of FIG. 4 may change every symbol interval T modulo $N_h$. Thus, the three modulation index factors ($K_0, K_1, K_2$) may be input to CPE 210, e.g., in order (for example), and then the sequence may repeat, for example. $K_0, K_1, K_2, K_0, K_1, K_2, K_0, \ldots$ Similarly, the input symbols U are sequentially input to CPE 210 via line 412, e.g., one symbol U input every symbol interval T. The input symbols U are temporarily stored in L memory elements (not shown, but provided between delay elements T) as the input symbols U sequentially pass through delay elements. Each delay element T is for one symbol interval. Input symbols U that are older than L symbols, such as $U_{k-L+1}$, are each multiplied by or scaled by an associated modulation index factor K at multiplier 414, and then input to a modulo P adder 416. After a delay element, the next term output from the multiplier 414 is added to current sum at adder 416 to generate the cumulative phase $\theta_{k-L}$ for CPE 210, which is output via line 418. Thus, according to an example embodiment, the output of the CPE 210, as shown in FIG. 4 may include L output symbols 420 that includes the L most recently received input symbols $U_k, U_{k-1}, \ldots U_{k-L+1}$, and the cumulative phase $\theta_{k-L}$ output via line 418.

In addition, the diagram of FIG. 4 also includes a circuit for generating the partial cumulative phases. There is a partial cumulative phase for each of the modulation indexes (or for each of the modulation index factors). The input symbol $U_{k-L+1}$ is delayed to provide $U_{k-L}$, is input via line 422 to a group of switches 424. There is a switch for each of the modulation indexes (or for each of the index factors). The first switch closes when $(k-L) \bmod N_h = 0$, to cause the selected input symbol to be scaled or multiplied by a corresponding modulation index factor K at multiplier 428 (for example). Other switches within block 424 similarly operate, where only one of the switches 424 will select the symbol to be multiplied or scaled by a corresponding modulation index factor. For example, for Nh=3, every third input symbol (starting with the initial symbol at time 0 ) is input to a first switch corresponding to the first partial phase term, scaled at multiplier 428, and then added to the previous sum (which may be delayed by a delay element 432 of $N_hT$) by modulo P adder 430, to generate the partial cumulative phase associated with a first modulation index factor, for example. Other partial phase terms may be similarly generated. As noted in the example above, for k=13, L=3, $N_h=3$, ($N_h=3$ means there are three modulation indexes in this example), the cumulative phase can be expressed as follows:

$$\theta_{k-L} = \theta_{10} = (K_0(U_0+U_3+U_6+U_9) + K_1(U_1+U_4+U_7) + K_2(U_2+U_5+U_8)) \bmod P \ldots$$

where the switch 424 corresponding to the first partial cumulative phase $\theta_{k-L}$ output via line 434 may select inputs U0, U3, U6, U9, etc. to be scaled (or multiplied by multiplier 428) by a modulation index K and summed by adder 430. Multiplier 436 and modulo P adder 438 may similarly operate for another partial cumulative phase for the last partial cumulative phase, for example. In this manner, for example, the partial phase terms may be calculated. The first partial cumulative phase $\theta^0_{k-L}$ may be output via line 434, ... and the last partial cumulative phase $\theta^{Nh-1}_{k-L}$ is output via line 442. The other partial cumulative phases may be similarly generated and output. The partial cumulative phases may be used, for example, by the termination symbol generator 218 to determine and generate one or more termination symbols to return an ending state of the CPE 210 to the same as the initial state of the CPE 210 (e.g., by determining termination symbols that force each partial cumulative phase to zero), according to an example embodiment.

In an example embodiment, the circuit (e.g., switches 424, multipliers 428, 436, adders 430 438 and delay elements 432 and 440) for generating the partial cumulative phase terms may be provided in the CPE 210. In another example embodiment, the circuit for generating the partial cumulative phases may be provided within termination symbol generator 218.

In an example embodiment for FIG. 4, the modulation indexes K may be used as a scaling factor for the inputs (rather than the modulation indexes), since all the modulation indexes (K/P) have a common denominator P, which may be removed from the calculation, for example. Alternatively, the modulation indexes may be used as a scaling factor. Also, the outputs of the CPE may include what has been referred to as cumulative phases or partial cumulative phases, since it is a cumulative term, and the input symbols are subsequently used to phase modulate a signal (in phase modulator 212). However, these outputs, are not necessarily considered as phases, since the phase modulation is performed in the next block, the phase modulator 212 (see FIG. 2).

As noted above, phase discontinuities between data blocks may be eliminated or at least decreased by forcing the ending state of the CPE to be the same as the initial state of the CPE. For example, if the initial state of the CPE is the zero state, then phase discontinuities between data blocks may be decreased by returning the CPE to the zero state at approximately the end of the data block (e.g., prior to receiving the next data block). The cumulative phase can be returned to the zero state (e.g., example known state) by returning each of its partial components (partial cumulative phases) back to the zero state. Thus, according to an example embodiment, a number of operations may be performed to accomplish this, including: (1) return each of the cumulative phases to the zero state (e.g., select and generate termination symbols to cause each partial cumulative phase to be equal to zero, $\theta_n = 0$ at some future time, $n \geq k-L$) and (2) to reset the remainder of the CPE state (the U input symbols) to be equal to the all zeros-vector, so that $x_n = (0,0,\ldots,0)^T$ at future time $n \geq k-L$. Aspects of this algorithm are described in greater detail below, according to an example embodiment. This is merely an example, and other ways or techniques may be used as well. In a general case, the partial phase(s) may be modulo P, while the termination symbols may be modulo M, where M and P may be different. Operations 1-10 below may be performed, for example, by termination symbol generator 218 (FIG. 2). In another example embodiment, one or more of these operations may be performed (or assisted by) other blocks, such as CPE 210.

1) The termination symbol generator 218 (and/or CPE 210) calculates and stores the values of the partial cumulative phase terms as the data symbols pass through the CPE 210. The termination symbol generator may receive the data symbols or Us, as they are input to the CPE 210, or as they are output from the CPE 210 (as shown).

2) After the last data symbol, $U_{N-1}$, (for a data block of N data symbols) has entered the CPE 210, the termination symbol generator 218 may determine and generate a group or series of T termination symbols. Termination symbol generator 218 begins to send this series of M-ary trellis termination symbols, $\{t_0, \ldots, t_{T-1}\}$, where $t_i \in \{0, \ldots, M-1\}$ for $i=0, \ldots, T-1$. For example, for a binary system (M=2), the trellis termination symbols may be either 0 or 1.

3) For L>1, we compute the value of the cumulative phase when the first termination symbol $t_0$ reaches the modulo P adder 416 (or first contributes to the cumulative phase): $\theta_{(N+L-1)L}$.

4) For $n=0, \ldots, N_{h-1}$: (in other words, for each modulation index), the termination symbol generator 218 will calculate the first trellis termination symbol $t_0$ associated with each modulation index factor: $t_0{}^n = \lfloor((P-1-\theta^n_{(N-L-1)-L}) \bmod (M-1)\rfloor + 1$. The bracket in this operation is a flooring operation which rounds down to the nearest integer.

5) Calculate the number of additional trellis termination symbols (which have a non-zero value) that are required to force the nth partial cumulative phase term to return to zero; Each partial cumulative phase may require a different number of additional termination symbols to force that partial cumulative phase to zero (0). The bracket here is also a flooring operation:

$$T_0(n) = \left\lfloor \frac{(P-1-\theta_{(N+L-1)-L}^n)}{M-1} \right\rfloor.$$

For example, for three modulation indexes:

($T_0$(n=0))=5, meaning that 5 additional non-zero termination symbols are required to force the partial cumulative phase associated with n=0 (or associated with the first modulation index) to zero;

($T_1$(n=1))=2, meaning that 2 additional non-zero termination symbols are required to force the partial cumulative phase associated with n=1 (or second modulation index) to zero;

($T_2$(n=2))=3, meaning that 3 additional non-zero termination symbols are required to force the partial cumulative phase associated with n=2 (or third modulation index) to zero.

6) For all $T_0(n) \geq 1$, define $t_1^n = \ldots = t_{T_0(n)}^n = M-1$. This sets all of these additional termination symbols to $M-1$.

7) Calculate the maximum number of additional trellis termination symbols, $$T_{max} = \left\lfloor \frac{P-1}{M-1} \right\rfloor$$

which are required to return each partial cumulative phase term, $\theta_{k-L}^n$, to the zero state. This enables the use of fixed transmission block sizes, from one block to the next.

8) Based on the calculation in 7), set $t_{T_0(n)+1}^n = \ldots = t_{T_{max}}^n = 0$. These symbols zero-pad the data block so that the number of trellis termination symbols is always a constant. (Hence, the size of the data block may not be dependent on the data symbols). The zero-padding may be provided due to the trellis structure of the encoder, since the path in the trellis that leads back to the all-zero state is dependent on the encoder state. For example, the partial cumulative phase is identified that returns to zero the slowest (e.g., requiring the most non-zero termination symbols to return to zero state). The other (faster returning to zero) partial cumulative phase terms may be zero padded (e.g., receiving termination symbols that are zero value). Thus, additional termination symbols having a zero value are added (as padding) as inputs for the two partial cumulative phases that reach the zero state before the slowest partial cumulative phase. By setting the number of additional trellis termination symbols based on the calculation in 7), this may provide an equal size for the extended data block for all partial cumulative phases, even though different partial cumulative phases may require a different number of non-zero termination symbols to return to the zero or desired ending state.

9) Since it may be desired to return the state of the trellis back to the zero-state, construct an L×1 vector of zeros (0,0, . . . ,0). This vector will be used to flush the encoder after the cumulative phase has been returned to the zero state.

10) Map the partial trellis termination symbols $\{t_k^n\}$ and the L×1 vector of zeros in (9) to a set of trellis termination symbols: $\{t_0, t_1, t_2, \ldots, t_{T-1}\}$, where $$T = N_h(T_{max} + 1) + L = N_h\left(\left\lfloor \frac{P-1}{M-1} \right\rfloor + 1\right) + L.$$

Although the order of the mapping does not matter, the convention may be used, for example, that the non-zero termination symbols are input or sent through, in ascending order of the modulation index factor, followed by a string of zeros. In general, the termination symbols can be represented as follows:

$$\Big\{ \underbrace{t_0^0, t_1^0 \ldots, t_{T_0(0)}^0}_{(M-1) \ldots (M-1)}, \ldots, \underbrace{t_0^{N_h-1}, t_1^{N_h-1} \ldots, t_{T_0(N_h)}^{N_h-1}}_{(M-1) \ldots (M-1)},$$

$$\underbrace{t_{T_0(0)+1}^0, \ldots, t_{T_{max}}^0, \ldots, t_{T_0(N_h)+1}^{N_h-1}, \ldots, t_{T_{max}}^{N_h-1}}_{0 \ldots 0}, \underbrace{0, \ldots, 0}_{L \times 1} \Big\}$$

11) These termination symbols are then input to the CPE. For example, the termination symbol generator 218 may generate these termination symbols which are input to the CPE 210. Once these termination symbols have been sent through the CPE 210, the cumulative phase state will be equal to zero.

A simple yet illustrative example of the trellis termination technique outlined above will now be provided, according to an example embodiment. In this example, the following may be defined:

N=128;M=4;L=3;P=5;$N_h$=3;$K_0$=1;$K_1$=2;$K_2$=3
$\theta_{127}^0$=3;$\theta_{127}^1$=1;$\theta_{127}^2$=1
$\theta_{127}$=($K_0\theta_{127}^0$+$K_1\theta_{127}^1$+$K_2\theta_{127}^2$)mod P=3

When the first termination symbol enters the modulo P adder 416, the cumulative phase term is given by $$\theta_{N+L-1-L} = \theta_{127} = \left(\sum_{n=0}^{2} K_n\theta_{127}^n\right) \bmod P,$$

where $\theta_{127}^n \in \{0,1,2,3,4\}$. Following the procedure enumerated above, the initial value of the partial termination symbols may be defined or calculated as follows—

$t_0^0 = ((P-1)-\theta_{127}^0)\bmod(M-1)+1=2$ $t_0^1 = ((P-1)-\theta_{127}^1)\bmod(M-1)+1=1$ $t_0^2 = ((P-1)-\theta_{127}^2)\bmod(M-1)+1=1$ The number of additional termination symbols that are required to return each of the partial cumulative phases to the zero state may be calculated as $$T_0(0) = \left\lfloor \frac{(P-1-\theta_{127}^0)}{M-1} \right\rfloor = 0$$

$$T_0(1) = \left\lfloor \frac{(P-1-\theta_{127}^1)}{M-1} \right\rfloor = 1$$

$$T_0(2) = \left\lfloor \frac{(P-1-\theta_{127}^2)}{M-1} \right\rfloor = 1$$

In addition, $$T_{max} = \left\lfloor \frac{P-1}{M-1} \right\rfloor = 1.$$

From the outlined procedure for calculating the remaining trellis termination symbols (for the purposes of zero-padding), it is found that $t_{T_0(0)+1}^0 = t_1^0 = 0.$ Hence, the trellis termination symbols are defined as:

$$\{t_0,t_1,t_2,t_3,t_4,t_5,t_6,t_7,t_8\}=\{t_0^0,t_0^1,t_1^1,t_0^2,t_1^2,t_1^0,0,0,0\}=\{2,1,3,1,3,0,0,0,0\}.$$

It can be shown that this approach does indeed return the final state of the trellis to the all-zeros state by considering the evolution of the state space model:

$$x_{N+L-1} = x_{130} = A_{129}x_{129} + Bu_{129}$$

$$= A_{129}x_{129} + Bt_1$$

$$\begin{pmatrix}\theta_{127}\\t_0\\t_1\end{pmatrix} = \begin{pmatrix}1 & K_1 & 0\\0 & 0 & 1\\0 & 0 & 0\end{pmatrix}\begin{pmatrix}\theta_{126}\\U_{127}\\t_0\end{pmatrix}+\begin{pmatrix}0\\0\\1\end{pmatrix}t_1$$

$$\begin{pmatrix}3\\2\\1\end{pmatrix} = \begin{pmatrix}1 & 1 & 0\\0 & 0 & 1\\0 & 0 & 0\end{pmatrix}\begin{pmatrix}\theta_{126}\\U_{127}\\2\end{pmatrix}+\begin{pmatrix}0\\0\\1\end{pmatrix}(1)$$

At the next symbol interval, $$x_{131} = A_{130}x_{130} + Bu_{130}$$

$$= A_{130}x_{130} + Bt_2$$

$$\begin{pmatrix}\theta_{128}\\t_1\\t_2\end{pmatrix} = \begin{pmatrix}1 & K_2 & 0\\0 & 0 & 1\\0 & 0 & 0\end{pmatrix}\begin{pmatrix}\theta_{127}\\t_0\\t_1\end{pmatrix}+\begin{pmatrix}0\\0\\1\end{pmatrix}t_2$$

$$\begin{pmatrix}2\\1\\3\end{pmatrix} = \begin{pmatrix}1 & 2 & 0\\0 & 0 & 1\\0 & 0 & 0\end{pmatrix}\begin{pmatrix}3\\2\\1\end{pmatrix}+\begin{pmatrix}0\\0\\1\end{pmatrix}(3)$$

Advancing one symbol interval, $$x_{132} = A_{131}x_{131} + Bu_{131}$$

$$= A_{131}x_{131} + Bt_3$$

$$\begin{pmatrix}\theta_{129}\\t_2\\t_3\end{pmatrix} = \begin{pmatrix}1 & K_0 & 0\\0 & 0 & 1\\0 & 0 & 0\end{pmatrix}\begin{pmatrix}\theta_{128}\\t_1\\t_2\end{pmatrix}+\begin{pmatrix}0\\0\\1\end{pmatrix}t_3$$

$$\begin{pmatrix}4\\3\\1\end{pmatrix} = \begin{pmatrix}1 & 1 & 0\\0 & 0 & 1\\0 & 0 & 0\end{pmatrix}\begin{pmatrix}2\\1\\3\end{pmatrix}+\begin{pmatrix}0\\0\\1\end{pmatrix}(1)$$

Continuing (after next symbol interval), $$x_{133} = A_{132}x_{132} + Bu_{132}$$

$$= A_{132}x_{132} + Bt_4$$

$$\begin{pmatrix}\theta_{130}\\t_3\\t_4\end{pmatrix} = \begin{pmatrix}1 & K_1 & 0\\0 & 0 & 1\\0 & 0 & 0\end{pmatrix}\begin{pmatrix}\theta_{129}\\t_2\\t_3\end{pmatrix}+\begin{pmatrix}0\\0\\1\end{pmatrix}t_4$$

$$\begin{pmatrix}2\\1\\3\end{pmatrix} = \begin{pmatrix}1 & 1 & 0\\0 & 0 & 1\\0 & 0 & 0\end{pmatrix}\begin{pmatrix}4\\3\\1\end{pmatrix}+\begin{pmatrix}0\\0\\1\end{pmatrix}(3)$$

Continuing (after next symbol interval), $$x_{134} = A_{133}x_{133} + Bu_{133}$$

$$= A_{133}x_{133} + Bt_5$$

$$\begin{pmatrix}\theta_{131}\\t_4\\t_5\end{pmatrix} = \begin{pmatrix}1 & K_2 & 0\\0 & 0 & 1\\0 & 0 & 0\end{pmatrix}\begin{pmatrix}\theta_{130}\\t_3\\t_4\end{pmatrix}+\begin{pmatrix}0\\0\\1\end{pmatrix}t_5$$

$$\begin{pmatrix}4\\3\\0\end{pmatrix} = \begin{pmatrix}1 & 2 & 0\\0 & 0 & 1\\0 & 0 & 0\end{pmatrix}\begin{pmatrix}2\\1\\4\end{pmatrix}+\begin{pmatrix}0\\0\\1\end{pmatrix}(0)$$

$$x_{135} = A_{134}x_{134} + Bu_{134}$$

$$= A_{134}x_{134} + Bt_6$$

$$\begin{pmatrix}\theta_{132}\\t_5\\t_6\end{pmatrix} = \begin{pmatrix}1 & K_0 & 0\\0 & 0 & 1\\0 & 0 & 0\end{pmatrix}\begin{pmatrix}\theta_{131}\\t_4\\t_5\end{pmatrix}+\begin{pmatrix}0\\0\\1\end{pmatrix}t_6$$

$$\begin{pmatrix}0\\0\\0\end{pmatrix} = \begin{pmatrix}1 & 1 & 0\\0 & 0 & 1\\0 & 0 & 0\end{pmatrix}\begin{pmatrix}4\\3\\0\end{pmatrix}+\begin{pmatrix}0\\0\\1\end{pmatrix}(0)$$

Taking one more time step (another symbol interval), $$x_{136} = A_{135}x_{135} + Bu_{135}$$

$$= A_{135}x_{135} + Bt_7$$

$$\begin{pmatrix}\theta_{133}\\t_6\\t_7\end{pmatrix} = \begin{pmatrix}1 & K_1 & 0\\0 & 0 & 1\\0 & 0 & 0\end{pmatrix}\begin{pmatrix}\theta_{132}\\t_5\\t_6\end{pmatrix}+\begin{pmatrix}0\\0\\1\end{pmatrix}t_7$$

$$\begin{pmatrix}0\\0\\0\end{pmatrix} = \begin{pmatrix}1 & 1 & 0\\0 & 0 & 1\\0 & 0 & 0\end{pmatrix}\begin{pmatrix}0\\0\\0\end{pmatrix}+\begin{pmatrix}0\\0\\1\end{pmatrix}(0)$$

Finally, the last termination symbol is sent into the CPE 210 and the state representation is $$x_{137} = A_{136}x_{136} + Bu_{136}$$

$$= A_{138}x_{138} + Bt_8$$

$$\begin{pmatrix}\theta_{134}\\t_7\\t_8\end{pmatrix} = \begin{pmatrix}1 & K_2 & 0\\0 & 0 & 1\\0 & 0 & 0\end{pmatrix}\begin{pmatrix}\theta_{133}\\t_6\\t_7\end{pmatrix}+\begin{pmatrix}0\\0\\1\end{pmatrix}t_8$$

$$\begin{pmatrix}0\\0\\0\end{pmatrix} = \begin{pmatrix}1 & 1 & 0\\0 & 0 & 1\\0 & 0 & 0\end{pmatrix}\begin{pmatrix}0\\0\\0\end{pmatrix}+\begin{pmatrix}0\\0\\1\end{pmatrix}(0)$$

Hence, the algorithm has successfully terminated the encoder in the all-zeros state, since $x_{137}=(0,0,0)^T$. We note that although the zero state was reached before the last termination symbol was sent into the encoder, that in order to maintain a constant block size, we are constrained, in this exmple, to use the maximum number of termination symbols for each of the partial cumulative phase terms.

According to an example embodiment, the number of termination symbols for a set of selected CPM-based schemes are listed in Table 1 below.

TABLE 1

| Cardinality of the CPM-based system | P | Number of termination symbols, T |
|---|---|---|
| Binary (M = 2) | 2 | $2N_h + L$ |
| Binary | 3, 4, ... | $PN_h + L$ |
| Quaternary (M = 4) | 2, 3 | $N_h + L$ |
| Quaternary | 4, 5, 6 | $2N_h + L$ |
| Quaternary | 7, 8, 9 | $3N_h + L$ |
| Octal (M = 8) | 2, 3, ..., 7 | $N_h + L$ |
| Octal | 8, 9, ..., 14 | $2N_h + L$ |
| Hexadecimal (M = 16) | 2, 3, ..., 15 | $N_h + L$ |

Figure 5:
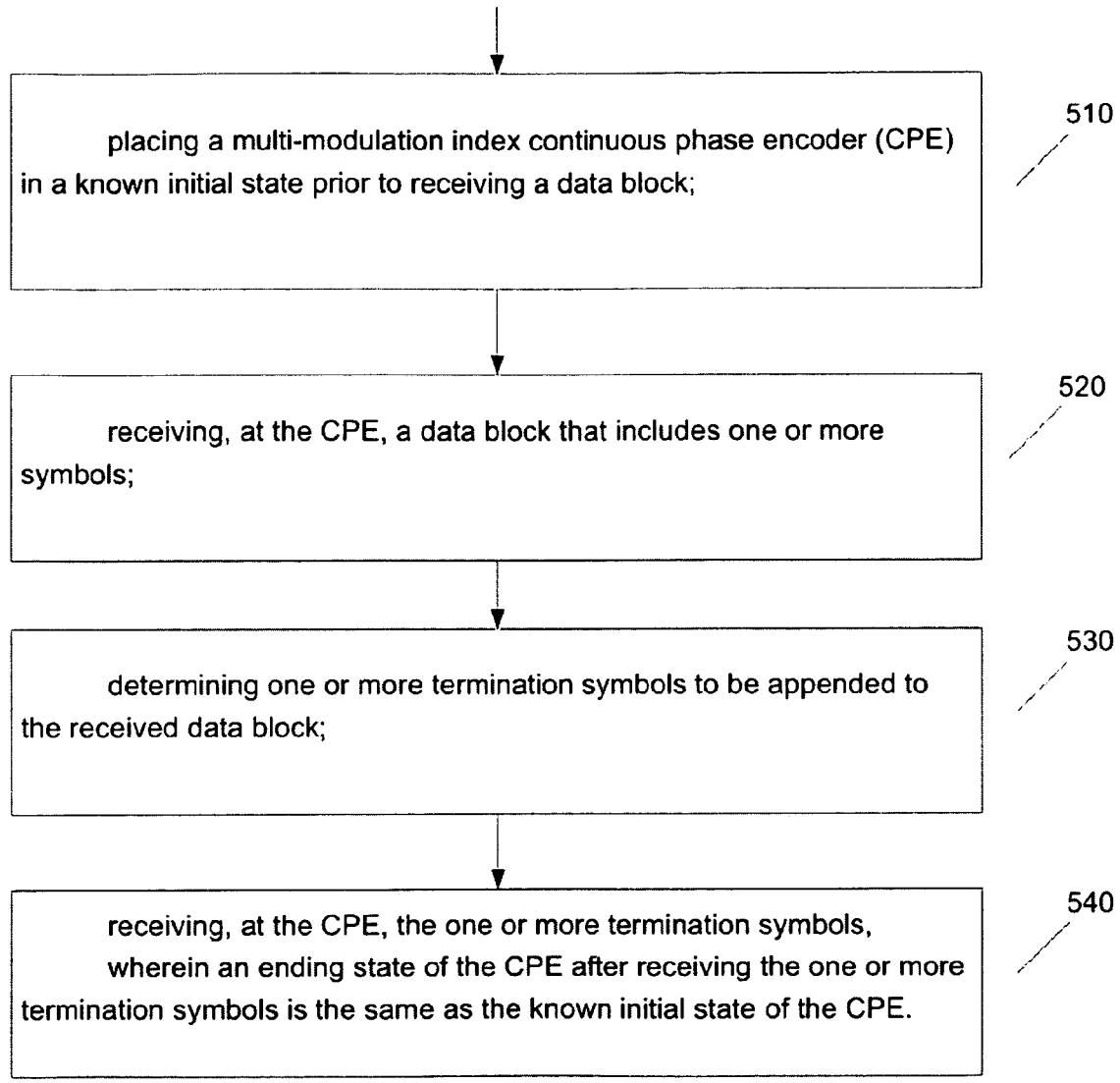
FIG. 5 is a flow chart illustrating operation of a wireless node according to an example embodiment.

FIG. 5 is a flow chart illustrating operation of a wireless node according to an example embodiment. Operation 510 may include placing a multi-modulation index continuous phase encoder (CPE) in a known initial state prior to receiving a data block. Operation 520 may include receiving, at the CPE, a data block that includes one or more symbols. Operation 530 may include determining one or more termination symbols to be appended to the received data block. Operation 540 may include receiving, at the CPE, the one or more termination symbols, wherein an ending state of the CPE after receiving the one or more termination symbols is the same as the known initial state of the CPE.

In the flow chart illustrated in FIG. 5, the method may further include phase modulating at least the data symbols, and transmitting the modulated symbols.

In the flow chart illustrated in FIG. 5, the method may further include phase modulating the data symbols and the termination symbols, and transmitting the modulated symbols.

In the flow chart illustrated in FIG. 5, the state of the CPE may be based upon one or more received symbols and a cumulative phase, the determining (530) one or more termination symbols may include: determining, based on the cumulative phase, a partial cumulative phase associated with each of a plurality of modulation indexes for the CPE; and determining the one or more termination symbols that forces each of the partial cumulative phases to zero after the CPE has received the termination symbols.

In the flow chart illustrated in FIG. 5, the state of the CPE may be based upon one or more received symbols and a cumulative phase, the determining (530) one or more termination symbols may include: determining, after the data symbols have been received by the CPE, a partial cumulative phase associated with each of a plurality of modulation indexes for the CPE, determining one or more partial termination symbols having a non-zero value for each modulation index; determining one or more partial termination symbols having a zero value for one or more of the modulation indexes, wherein the partial termination symbols are determined to force the partial cumulative phase associated with each of the modulation indexes to zero after the CPE has received the data block and the termination symbols, and mapping the partial termination symbols to one or more termination symbols.

Figure 6:
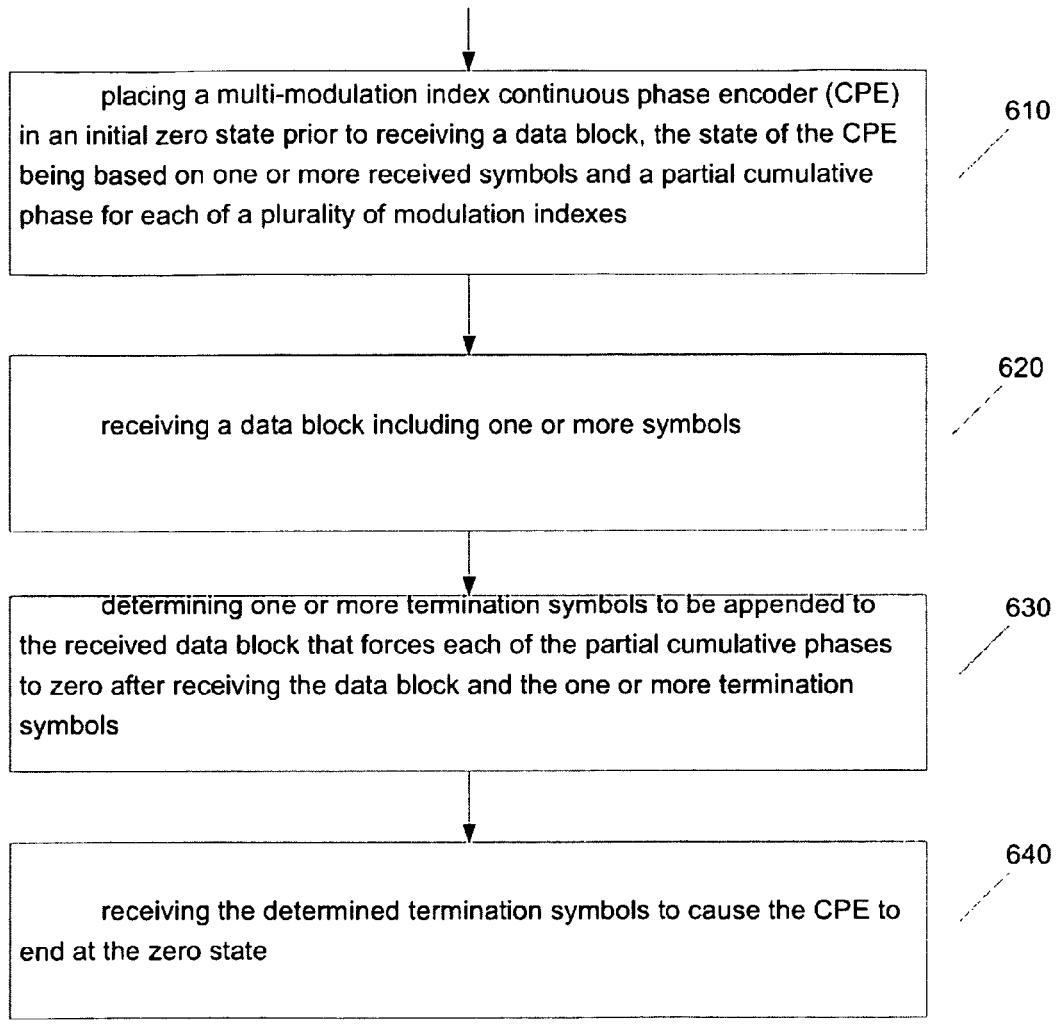
FIG. 6 is a flow chart illustrating operation of a wireless node according to another example embodiment.

FIG. 6 is a flow chart illustrating operation of a wireless node according to another example embodiment. Operation 610 may include placing a multi-modulation index continuous phase encoder (CPE) in an initial zero state prior to receiving a data block, the state of the CPE being based on one or more received symbols and a partial cumulative phase for each of a plurality of modulation indexes. Operation 620 may include receiving a data block including one or more symbols. Operation 630 may include determining one or more termination symbols to be appended to the received data block that forces each of the partial cumulative phases to zero after receiving the data block and the one or more termination symbols. Operation 640 may include and receiving the determined termination symbols to cause the CPE to end at the zero state.

In the flow chart of FIG. 6, the state of the CPE may be based upon one or more received symbols and a cumulative phase. The determining operation 630 may include determining, after the data symbols have been received by the CPE, a partial cumulative phase associated with each of a plurality of modulation indexes for the CPE, determining one or more partial termination symbols having a non-zero value for each modulation index, determining one or more partial termination symbols having a zero value for one or more of the modulation indexes, wherein the partial termination symbols are determined to force the partial cumulative phase associated with each of the modulation indexes to zero after the CPE has received the data block and the termination symbols, and mapping the partial termination symbols to one or more termination symbols.

Figure 7:
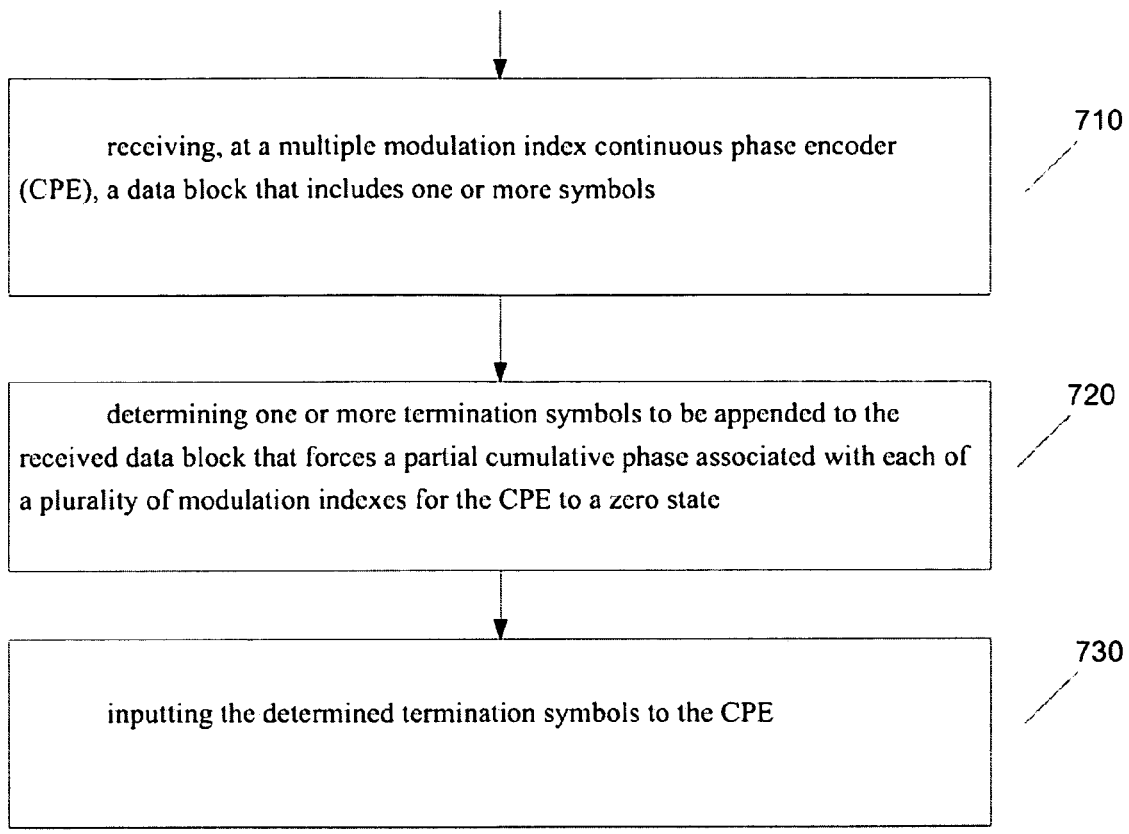
FIG. 7 is a flow chart illustrating operation of a wireless node according to another example embodiment.

FIG. 7 is a flow chart illustrating operation of a wireless node according to an example embodiment. Operation 710 may include receiving, at a multiple modulation index continuous phase encoder (CPE), a data block that includes one or more symbols. Operation 720 may include determining one or more termination symbols to be appended to the received data block that forces a partial cumulative phase associated with each of a plurality of modulation indexes for the CPE to a zero state. And, operation 730 may include inputting the determined termination symbols to the CPE.

The flow chart of FIG. 7 may further include phase modulating a signal based on the received symbols, and transmitting the phase modulated signal.

According to another example embodiment, an apparatus may include a multiple modulation index continuous phase encoder (CPE) configured to receive a data block that includes one or more symbols, and a termination symbol generator that is configured to: determine one or more termination symbols to be appended to the received data block that forces a partial cumulative phase associated with each of a plurality of modulation indexes for the CPE to a zero state and input the determined termination symbols to the CPE.

According to another example embodiment, an apparatus may include a multiple modulation index continuous phase encoder (CPE) configured to perform continuous phase encoding on one or more received symbols and to output CPE encoded symbols, the CPE being configured to a known initial state prior to receiving a data block of one or more symbols, and a termination symbol (TS) generator coupled to the CPE, the TS generator configured to generate one or more termination symbols to be appended to the received data block, wherein an ending state of the CPE after receiving the one or more termination symbols is the same as the known initial state of the CPE.

In an example embodiment, the apparatus may further include a phase modulator configured to phase modulate the CPE symbols output from the multiple modulation index CPE onto one or more subcarriers, and a radio transmitter to amplify and transmit the phase modulated signal via a transmission carrier.

In another example embodiment, the state of the CPE may be based upon one or more received symbols and a cumulative phase, the TS generator may be configured to determine, based on the cumulative phase, a partial cumulative phase associated with each of a plurality of modulation indexes for the CPE, determine the one or more termination symbols that forces each of the partial cumulative phases to zero after the CPE has received the termination symbols, and generate the determined termination symbols.

In another example embodiment, the state of the CPE may be based upon one or more received symbols and a cumulative phase, the TS generator may be configured to determine, after the data symbols have been received by the CPE, a partial cumulative phase associated with each of a plurality of modulation indexes for the CPE, determine one or more partial termination symbols having a non-zero value for each modulation index, determine one or more partial termination symbols having a zero value for one or more of the modulation indexes, wherein the partial termination symbols are determined to force the partial cumulative phase associated with each of the modulation indexes to zero after the CPE has received the data block and the termination symbols, map the partial termination symbols to one or more termination symbols, generate the termination symbols to be input to the CPE.

Figure 8:
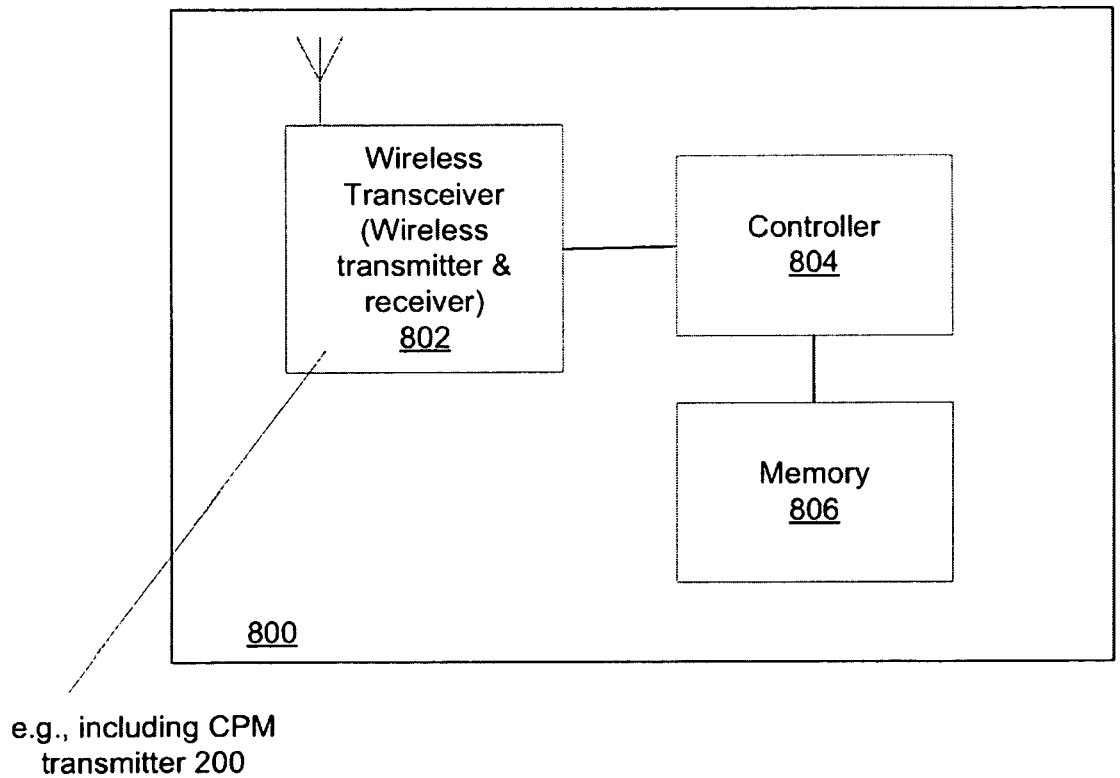
FIG. 8 is a block diagram of a wireless node according to an example embodiment.

FIG. 8 is a block diagram of a wireless node according to an example embodiment. The wireless node 800 may include a wireless transceiver 802 (including a transmitter for transmitting signals and a receiver for receiving signals), a controller 804 for providing overall control of the wireless node, and a memory 806 for storing information and instructions. For example, some operations illustrated in other FIGs. and/or described herein may be performed by a controller 804, under control of software or firmware, for example. Wireless transceiver 802 may include CPM transmitter 200 (see FIG. 2).

In addition, a storage medium may be provided that includes stored instructions, which when executed by a controller or processor may result in a controller, or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    placing a multi-modulation index continuous phase encoder (CPE) in a known initial state prior to receiving a data block;
    receiving, at the CPE, a data block that includes one or more symbols;
    determining one or more termination symbols to be appended to the received data block, including:
        determining, after the data symbols have been received by the CPE, a partial cumulative phase associated with each of a plurality of modulation indexes for the CPE;
        determining one or more partial termination symbols having a non-zero value for each modulation index;
        determining one or more partial termination symbols having a zero value for one or more of the modulation indexes, wherein the partial termination symbols are determined to force the partial cumulative phase associated with each of the modulation indexes to zero after the CPE has received the data block and the termination symbols; and
        mapping the partial termination symbols to one or more termination symbols; and receiving, at the CPE, the one or more termination symbols.

2. The method of claim 1 and further comprising:
phase modulating at least the data symbols; and
transmitting the modulated symbols.

3. The method of claim 1 and further comprising:
phase modulating the data symbols and the termination symbols; and
transmitting the modulated symbols.

4. The method of claim 1 wherein the state of the CPE is based upon one or more received symbols and a cumulative phase, the determining one or more termination symbols comprises:
determining, based on the cumulative phase, a partial cumulative phase associated with each of a plurality of modulation indexes for the CPE;
determining the one or more termination symbols that forces each of the partial cumulative phases to zero after the CPE has received the termination symbols.

5. The method of claim 1 wherein an ending state of the CPE after receiving the one or more termination symbols is the same as the known initial state.

6. A method comprising:
placing a multi-modulation index continuous phase encoder (CPE) in an initial zero state prior to receiving a data block, the state of the CPE being based on one or more received symbols and a partial cumulative phase for each of a plurality of modulation indexes;
receiving a data block including one or more symbols; and
determining one or more termination symbols to be appended to the received data block that forces each of the partial cumulative phases to zero, including:
determining, after the data symbols have been received by the CPE, a partial cumulative phase associated with each of a plurality of modulation indexes for the CPE;
determining one or more partial termination symbols having a non-zero value for each modulation index;
determining one or more partial termination symbols having a zero value for one or more of the modulation indexes, wherein the partial termination symbols are determined to force the partial cumulative phase associated with each of the modulation indexes to zero after the CPE has received the data block and the termination symbols; and
mapping the partial termination symbols to one or more termination symbols;
receiving the determined termination symbols to cause the CPE to end at the zero state.

7. A method comprising:
receiving, at a multiple modulation index continuous phase encoder (CPE), a data block that includes one or more symbols;
outputting, by the multiple modulation index CPE, at least a plurality of cumulative phases including a partial cumulative phase for each of a plurality of modulation indexes;
determining, based on the plurality of partial cumulative phases, one or more termination symbols to be appended to the received data block that forces the partial cumulative phase for each of the plurality of modulation indexes for the CPE to a zero state; and
inputting the determined termination symbols to the CPE.

8. The method of claim 7 and further comprising:
phase modulating a signal based on the received symbols; and
transmitting the phase modulated signal.

9. An apparatus comprising:
a multiple modulation index continuous phase encoder (CPE) configured to receive a data block that includes one or more symbols, the multiple modulation index CPE also configured to output at least a plurality of cumulative phases including a partial cumulative phase for each of a plurality of modulation indexes; and
a termination symbol generator that is configured to:
determine, based on the plurality of partial cumulative phases, one or more termination symbols to be appended to the received data block that forces the partial cumulative phase for each of the plurality of modulation indexes for the CPE to a zero state; and
input the determined termination symbols to the CPE.

10. The apparatus of claim 9 wherein the multiple modulation index CPE includes a different trellis state for each of the plurality of modulation indexes.

11. The apparatus of claim 9 wherein the multiple modulation index CPE includes a trellis with time varying properties to reflect a varying state for the plurality of modulation indexes.

12. An apparatus comprising:
a multiple modulation index continuous phase encoder (CPE) configured to perform continuous phase encoding on one or more received symbols and to output CPE encoded symbols, the CPE being configured to a known initial state prior to receiving a data block of one or more symbols;
a termination symbol (TS) generator coupled to the CPE, the TS generator configured to generate one or more termination symbols to be appended to the received data block, wherein an ending state of the CPE after receiving the one or more termination symbols is the same as the known initial state of CPE;
wherein the state of the CPE is based upon one or more received symbols and a cumulative phase, the TS generator being configured to:
determine, after the data symbols have been received by the CPE, a partial cumulative phase associated with each of a plurality of modulation indexes for the CPE;
determine one or more partial termination symbols having a non-zero value for each modulation index;
determine one or more partial termination symbols having a zero value for one or more of the modulation indexes, wherein the partial termination symbols are determined to force the partial cumulative phase associated with each of the modulation indexes to zero after the CPE has received the data block and the termination symbols;
map the partial termination symbols to one or more termination symbols; and
generate the termination symbols to be input to the CPE.

13. The apparatus of claim 12 and further comprising:
a phase modulator configured to phase modulate the CPE symbols output from the multiple modulation index CPE onto one or more subcarriers; and
a radio transmitter to amplify and transmit the phase modulated signal via a transmission carrier.

14. A method comprising:
receiving a data block including one or more symbols;
determining, after the data symbols have been received by the continuous phase encoder (CPE), a partial cumulative phase associated with each of a plurality of modulation indexes for the CPE;
determining one or more partial termination symbols for each of a plurality of the modulation indexes, wherein at least one of the partial termination symbols is determined to force the partial cumulative phase associated with each of a plurality of the modulation indexes to zero as well as to force the final state of the CPE to zero after receipt of all termination symbols, wherein each partial cumulative phase is based on a summation of symbols weighted by a respective modulation index;

mapping the partial termination symbols to one or more termination symbols; and receiving the termination symbols;

appending the termination symbols to the received data block to force each of the partial cumulative phases to zero after receiving the data block.

* * * * *